(12) United States Patent
Seigler

(10) Patent No.: US 8,339,906 B2
(45) Date of Patent: Dec. 25, 2012

(54) TRANSDUCER ASSEMBLY FOR HEAT ASSISTED MAGNETIC RECORDING LIGHT DELIVERY

(75) Inventor: Michael Allen Seigler, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 286 days.

(21) Appl. No.: 12/826,758

(22) Filed: Jun. 30, 2010

(65) Prior Publication Data

US 2012/0002318 A1      Jan. 5, 2012

(51) Int. Cl.
*G11B 11/00* (2006.01)
(52) U.S. Cl. .................. 369/13.33; 369/112.27
(58) Field of Classification Search ............... 369/13.33, 369/13.32, 13.24, 13.14, 13.03, 13.02, 112.27, 369/121, 13.01, 13.17, 13.35, 112.01; 360/59, 360/234.4, 125.74
See application file for complete search history.

(56) References Cited

U.S. PATENT DOCUMENTS

| | | | |
|---|---|---|---|
| 6,944,112 B2 | 9/2005 | Challener | |
| 6,963,530 B1 | 11/2005 | Thornton et al. | |
| 7,609,480 B2 | 10/2009 | Shukh et al. | |
| 7,643,248 B2 | 1/2010 | Sluzewski | |
| 8,139,464 B2 * | 3/2012 | Peng | 369/112.27 |
| 2004/0001420 A1 | 1/2004 | Challener | |
| 2004/0081031 A1 | 4/2004 | Saga et al. | |
| 2007/0081427 A1 | 4/2007 | Suh et al. | |
| 2007/0159720 A1 | 7/2007 | Sohn et al. | |
| 2009/0073858 A1 | 3/2009 | Seigler et al. | |
| 2009/0208171 A1 | 8/2009 | Gage et al. | |
| 2012/0020195 A1 * | 1/2012 | Seigler | 369/13.32 |

* cited by examiner

*Primary Examiner* — Ali Neyzari
(74) *Attorney, Agent, or Firm* — Hollingsworth Davis, LLC

(57) ABSTRACT

An apparatus includes a transducer assembly including a waveguide having a core layer and a cladding layer adjacent to the core layer, and a grating structured to couple electromagnetic radiation into the waveguide; and a light source mounted on the cladding to direct light onto the grating at an acute angle with respect to a plane containing the grating.

19 Claims, 6 Drawing Sheets

TRANSDUCER ASSEMBLY FOR HEAT ASSISTED MAGNETIC RECORDING LIGHT DELIVERY

BACKGROUND

Heat assisted magnetic recording (HAMR) generally refers to the concept of locally heating recording media to reduce the coercivity of the media so that the applied magnetic writing field can more easily direct the magnetization of the media during the temporary magnetic softening of the media caused by the heat source. A tightly confined, high power laser light spot is used to heat a portion of the recording media to substantially reduce the coercivity of the heated portion. Then the heated portion is subjected to a magnetic field that sets the direction of magnetization of the heated portion. In this manner the coercivity of the media at ambient temperature can be much higher than the coercivity during recording, thereby enabling stability of the recorded bits at much higher storage densities and with much smaller bit cells.

One approach for directing light onto recording media uses a planar solid immersion mirror (PSIM), or lens, fabricated on a planar waveguide; and a near-field transducer (NFT), in the form of an isolated metallic nanostructure, placed near the PSIM focus. The near-field transducer is designed to reach a local surface plasmon (LSP) condition at a designated light wavelength. At LSP, a high field surrounding the near-field transducer appears, due to collective oscillation of electrons in the metal. Part of the field will tunnel into an adjacent media and get absorbed, raising the temperature of the media locally for recording.

There is a need to deliver high levels of optical radiation to the HAMR head in order to provide rapid heating of magnetic media. Various known solutions for coupling high levels of optical radiation to the HAMR head lead to arrangements that may adversely affect control characteristics.

SUMMARY

In one aspect, the invention provides an apparatus including a transducer assembly including a waveguide having a core layer and a cladding layer adjacent to the core layer, and a grating structured to couple electromagnetic radiation into the waveguide; and a light source mounted on the cladding to direct light onto the grating at an acute angle with respect to a plane containing the grating.

In another aspect, the invention provides an apparatus including a data storage medium, a transducer including a waveguide having a core layer and a cladding layer adjacent to the core layer, and a grating structured to couple electromagnetic radiation into the waveguide, a light source mounted on the cladding to direct light onto the grating at an acute angle with respect to a plane containing the grating, and an arm for positioning the transducer with respect to the data storage medium.

DETAILED DESCRIPTION OF THE INVENTION

Figure 1:
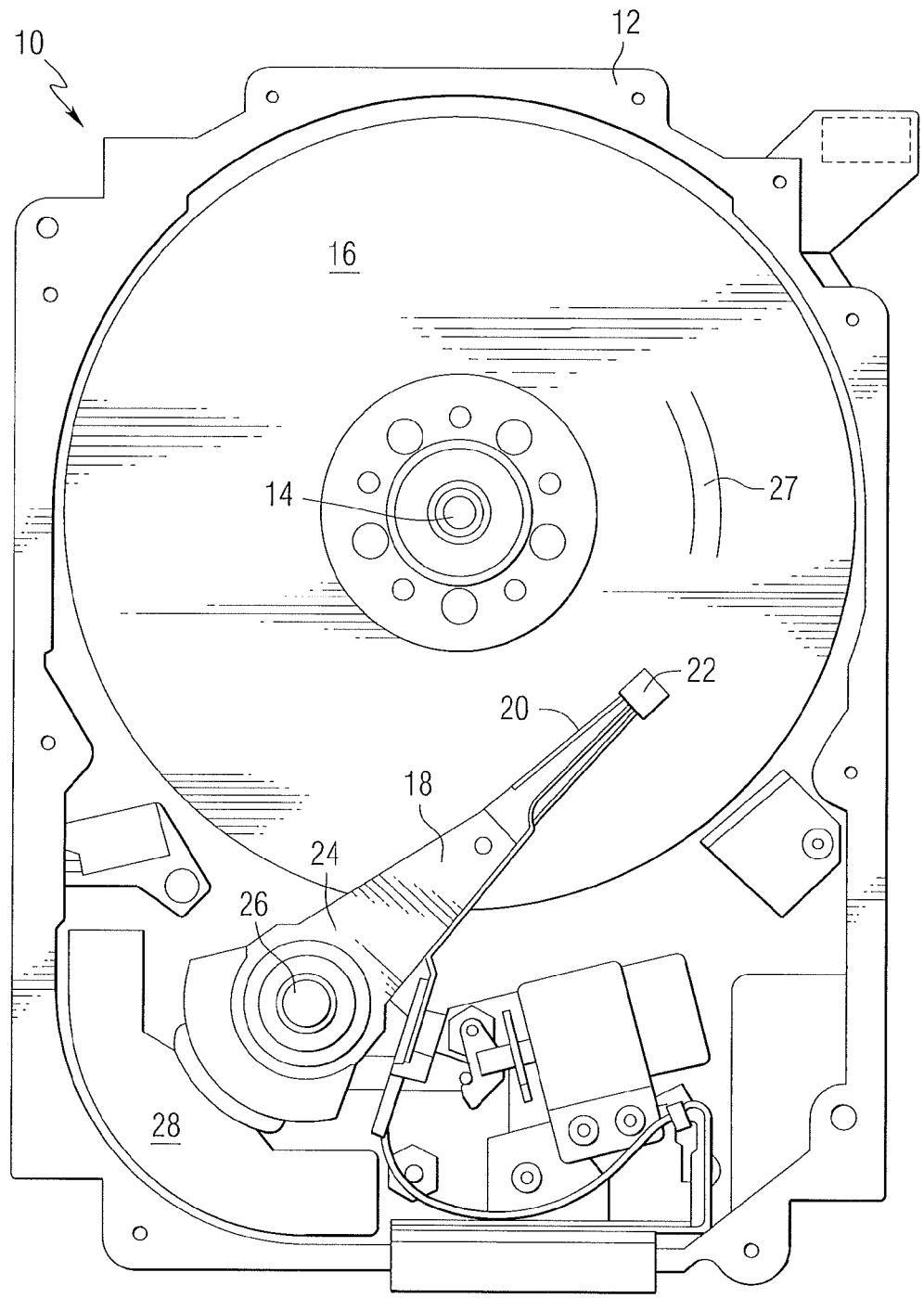
FIG. 1 is a pictorial representation of a data storage device in the form of a disc drive that can include a transducer in accordance with an aspect of this invention.

FIG. 1 is a pictorial representation of a data storage device in the form of a disc drive 10 that can utilize a transducer assembly constructed in accordance with an aspect of the invention. The disc drive 10 includes a housing 12 (with the upper portion removed and the lower portion visible in this view) sized and configured to contain the various components of the disc drive. The disc drive 10 includes a spindle motor 14 for rotating at least one magnetic recording media 16 within the housing. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired track 27 of the disc 16. The actuator motor 28 is regulated by a controller, which is not shown in this view and is well-known in the art.

For heat assisted magnetic recording (HAMR), an electromagnetic wave of, for example, visible, infrared or ultraviolet light is directed onto a surface of a data storage medium to raise the temperature of a localized area of the medium to facilitate switching of the magnetization of the area. Recent designs of HAMR recording heads include a thin film waveguide on a slider to guide light to the storage medium for localized heating of the storage medium. To launch light into the waveguide, a grating coupler can be used.

Figure 2:
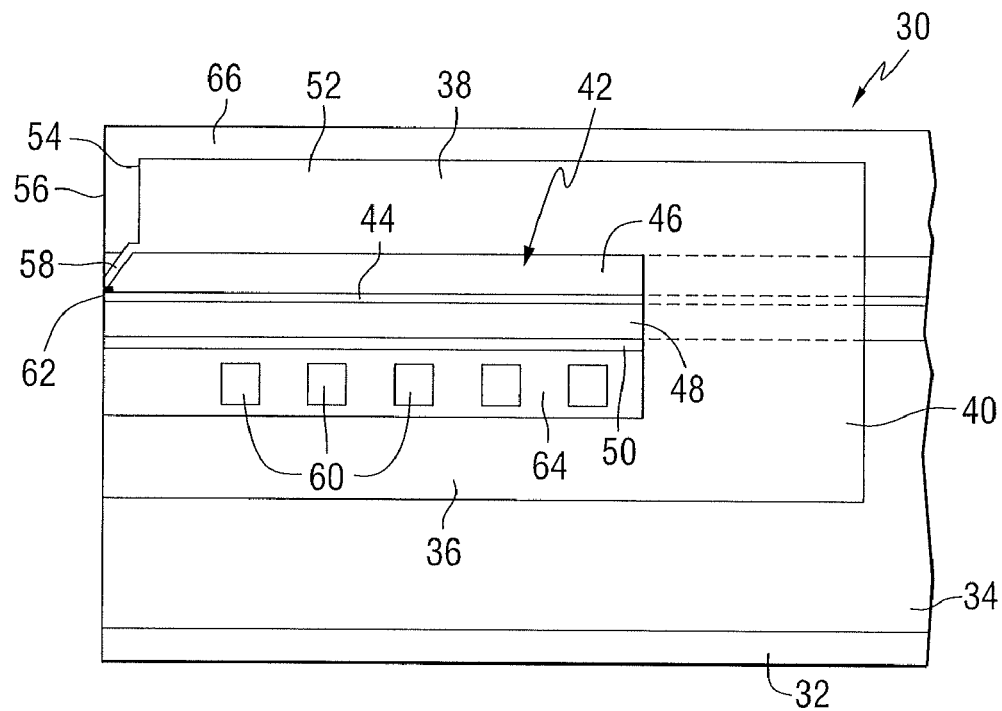
FIG. 2 is a cross-sectional view of a recording head.

FIG. 2 is a cross-sectional view of an example of a recording head for use in heat assisted magnetic recording. The recording head 30 includes A substrate 32, a base coat 34 on the substrate, a bottom pole 36 on the base coat, and a top pole 38 that is magnetically coupled to the bottom pole through a yoke or pedestal 40. A waveguide 42 is positioned between the top and bottom poles. The waveguide includes a core layer 44 and cladding layers 46 and 48 on opposite sides of the core layer. A mirror 50 is positioned adjacent to one of the cladding layers. The top pole is a two-piece pole that includes a first portion, or pole body 52, having a first end 54 that is spaced from the air bearing surface 56, and a second portion, or sloped pole piece 58, extending from the first portion and tilted in a direction toward the bottom pole. The second portion is structured to include an end adjacent to the air bearing surface 56 of the recording head, with the end being closer to the waveguide than the first portion of the top pole. A planar coil 60 also extends between the top and bottom poles and around the pedestal. A near-field transducer (NFT) 62 is positioned in the cladding layer 46 adjacent to the air bearing surface. An insulating material 64 separates the coil turns. Another layer of insulating material 66 is positioned adjacent to the top pole.

Figure 3:
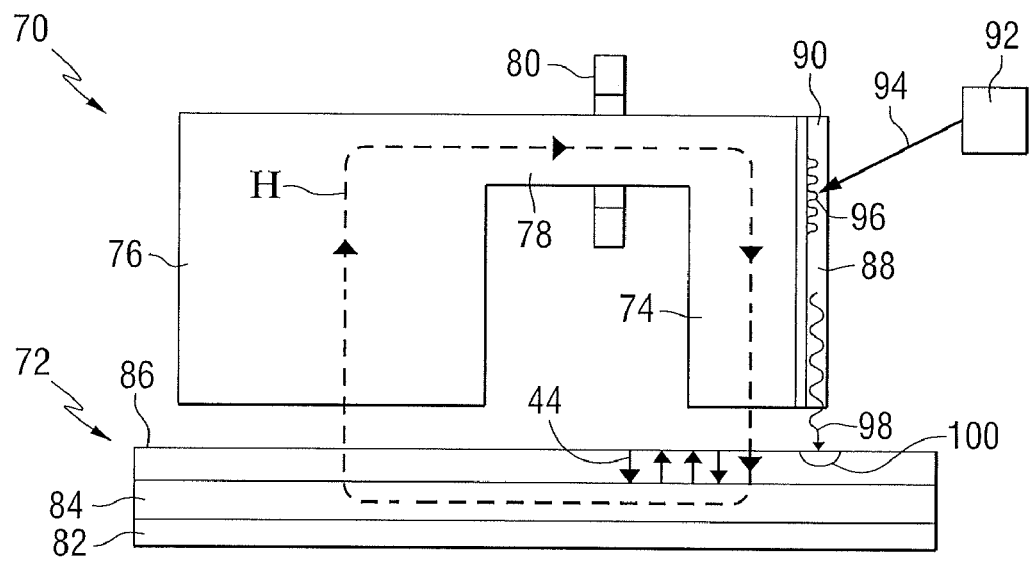
FIG. 3 is a schematic representation of a slider and a storage medium.

FIG. 3 is a schematic representation of a heat assisted magnetic recording head 70 that includes an optical transducer, in combination with a magnetic recording medium 72. The recording head 70 in this example includes a writer section comprising a main write pole 74 and a return or opposing pole 76 that are magnetically coupled by a yoke or pedestal 78. A magnetization coil 80 surrounds the yoke or pedestal 78 for energizing the recording head 70. The recording head 70 may also include a read head, not shown, which may be any type of read head, as is generally known in the art.

The recording medium 72 is positioned adjacent to or under the recording head 70. The recording medium 72 includes a substrate 82, which may be made of any suitable material such as ceramic glass or amorphous glass. A soft magnetic underlayer 84 is deposited on the substrate 82. The soft magnetic underlayer 84 may be made of any suitable material such as, for example, alloys or multilayers of Co, Fe, Ni, Pd, Pt or Ru. A hard magnetic recording layer 86 is deposited on the soft underlayer 84, with the perpendicular oriented magnetic domains contained in the hard recording layer 86. Suitable hard magnetic materials for the hard magnetic recording layer 86 may include at least one material selected from, for example, FePt or CoCrPt alloys having a relatively high anisotropy at ambient temperature.

The recording head 70 also includes a planar waveguide 88 that directs light received from a light source onto a surface of a recording medium to heat the magnetic recording medium 72 proximate to where the write pole 74 applies the magnetic write field H to the recording medium 72. The planar waveguide includes a light transmitting layer 90. The optical waveguide 88 acts in association with a light source 92 which transmits light, for example via an optical path 94. The light is coupled to the optical waveguide 88, by a coupling means such as a grating 96. The light source 92 may be, for example, a laser diode, or other suitable source of electromagnetic (EM) radiation. This provides for the generation of a guided mode that propagates through the optical waveguide 88 toward the recording medium. EM radiation, generally designated by reference number 98, is transmitted from the waveguide 88 for heating the recording medium 72, and particularly for heating a localized area 100 of the recording layer 86. Although FIG. 3 shows a perpendicular magnetic recording head and a perpendicular magnetic recording medium, it will be appreciated that the invention may also be used in conjunction with other types of recording heads and/ or recording mediums where it may be desirable to employ heat assisted recording.

In one aspect, this invention provides an apparatus for efficiently coupling light from a light source, such as a laser diode (LD) and into the waveguide (WG) on the back of the slider, which will be referred to as the HAMR head waveguide (HHWG) in this description.

Figure 4:
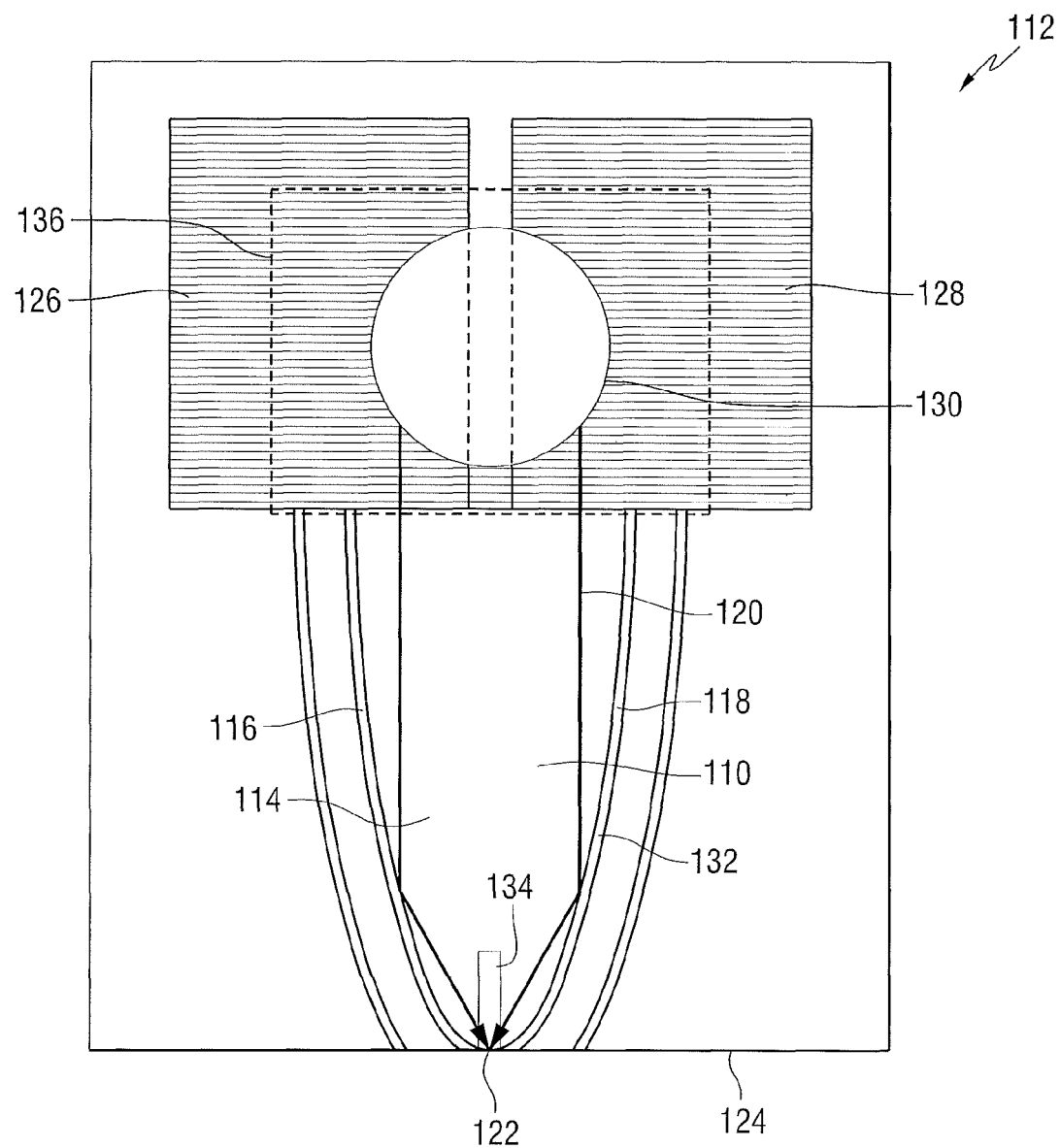
FIG. 4 is an elevation view of a waveguide in a recording head.

FIG. 4 is an elevation view of a waveguide 110 in a recording head 112. The waveguide includes a planar core layer 114 having generally parabolic edges 116 and 118, shaped to reflect light 120 to a focal point 122 at or near the air bearing surface 124. Gratings 126 and 128 are positioned on the core layer and used to couple light into the core layer. The gratings can be offset with respect to each other so that the electric component of the light in the two sides of the waveguide adds at the focal point. The light that impinges the gratings is shown as a spot 130. A reflective coating 132, which can be, for example, Au, is provided along the edges of the core layer. A return pole 134 is positioned adjacent to the air bearing surface.

A Vertical Cavity Surface Emitting Laser (VCSEL) can be placed directly over the gratings, in the location illustrated by box 136. The gratings can be manufactured using wafer level processing. The VCSEL can be mounted at an angle with respect to the grating plane to control the direction of the light that is coupled into the waveguide. This angle should be controlled to be within ±1° of the desired angle in order to have a high and repeatable efficiency. It would be desirable to provide a method for either controlling this angle to be within ±1° of the desired angle and/or collecting the light that couples into the waveguide in both directions.

Figure 5:
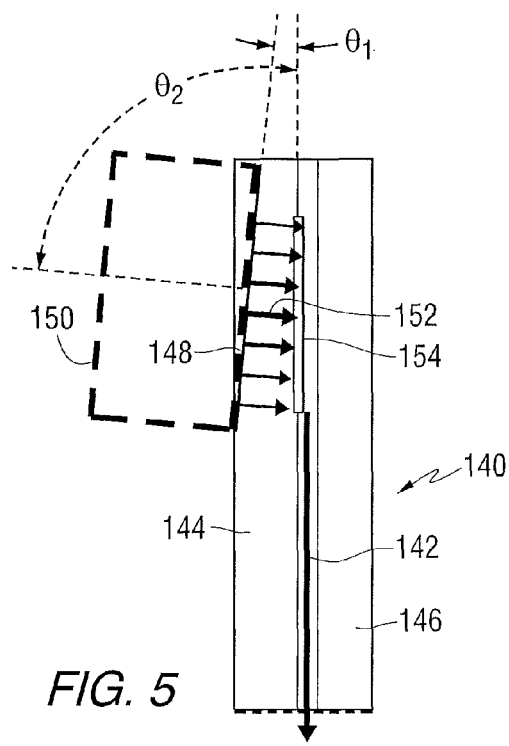
FIG. 5 is a side view of a waveguide and a light source.

In one embodiment, a portion of the cladding layer can be fabricated to have a slope with respect to the wafer surface. This embodiment is illustrated in FIG. 5. The waveguide 140 is shown to have a core layer 142 with cladding layers 144 and 146 on opposite sides of the core layer. Cladding layer 144 includes a sloped portion 148 that is inclined at an angle $\theta_1$ with respect to the plane of the core layer. The VCSEL 150 is mounted on the sloped portion and emits light 152 that impinges on the grating 154 at an acute angle $\theta_2$. In this embodiment, the VCSEL is placed directly on the wafer but the light emanating from the laser passes through the gratings at an angle. The alignment tolerance would be very large (>1 µm), and thus, should be able to be passively aligned, without requiring active feedback.

Figure 7:
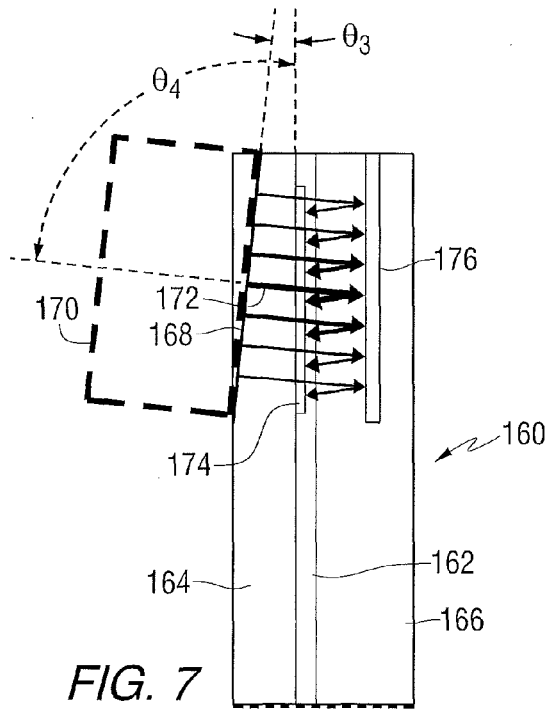
FIG. 7 is a side view of a waveguide and a light source.

FIG. 7 is a cross-sectional view of another embodiment. In FIG. 7, the waveguide 160 is shown to have a core layer 162 with cladding layers 164 and 166 on opposite sides of the core layer. Cladding layer 164 includes a sloped portion 168 that is inclined at an angle $\theta_3$ with respect to the plane of the core layer. The VCSEL 170 is mounted on the sloped portion and emits light 172 that impinges on the grating 174 at an acute angle $\theta_4$. A flat mirror 176 is positioned under the grating in an attempt to improve the coupling efficiency. In this example, the mirror lies in a plane substantially parallel to the plane of the core layer. However, the mirror may also lie in a plane that is tilted with respect to the plane of the core layer.

Figure 8:
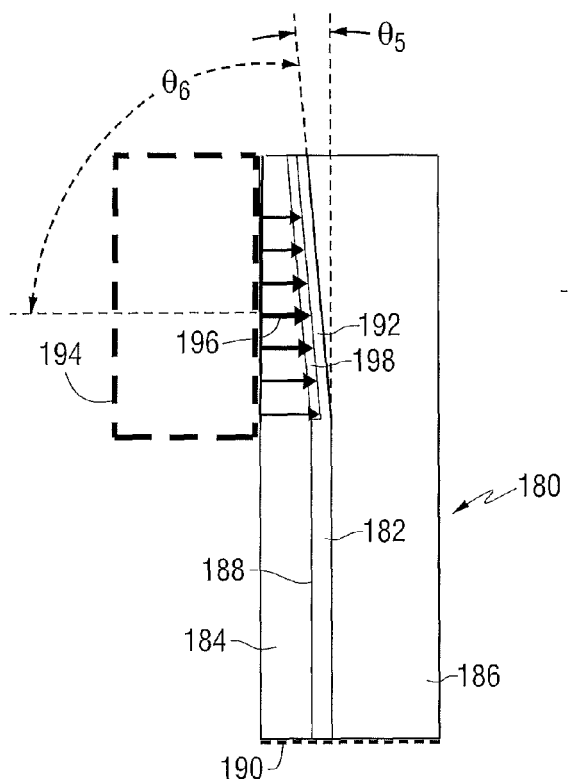
FIG. 8 is a side view of a waveguide and a light source.

FIG. 8 is a side view of another embodiment including a waveguide and a light source. In FIG. 8, the waveguide 180 is shown to have a core layer 182 with cladding layers 184 and 186 on opposite sides of the core layer. The core layer 182 includes a first portion 188 that lies in a first plane substantially perpendicular to air bearing surface 190 and a second portion 192 that is positioned in a second plane at an acute angle $\theta_5$ with respect to the first plane. The VCSEL 194 is mounted on the cladding layer 174 and emits light 196 that impinges on the grating 198 at an acute angle $\theta_6$.

Figure 6:
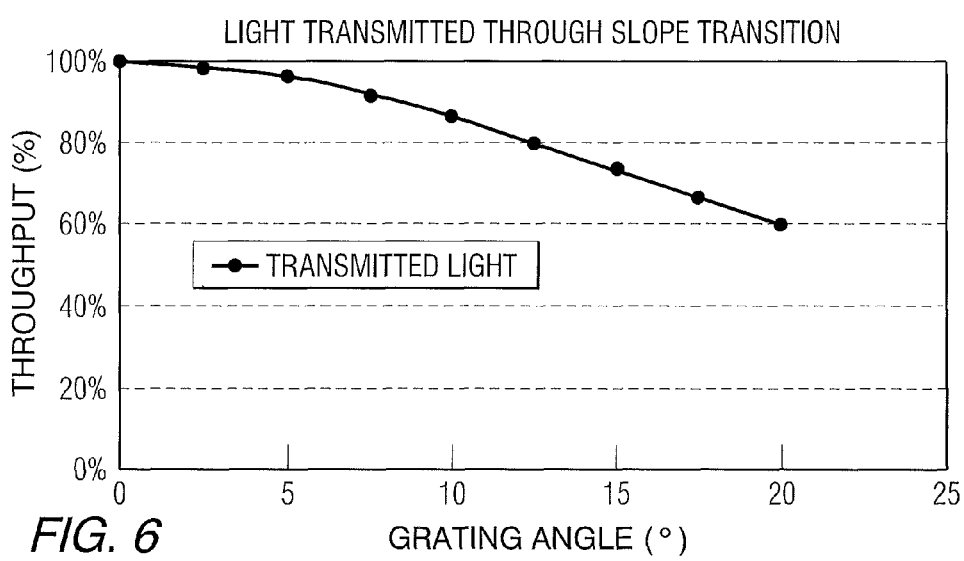
FIG. 6 is a graph of throughput versus grating angle.

FIG. 6 presents finite-difference time-domain (FDTD) modeling results for the structure of FIG. 8 showing that for an angle $\theta_5$ of 5°, only ~3.5% of the light is lost when propagating through the transition from the sloped portion (192) to the flat portion (188). An angle of 5° is big enough to get the light to couple in only one direction. The efficiency could be improved further by making multiple steps. That is, the sloped portion could include a plurality of sections positioned at different angles. Alternatively, instead of going directly from 5° to 0°, the sloped portion 192 could be rounded out using appropriate processing.

Figure 9:
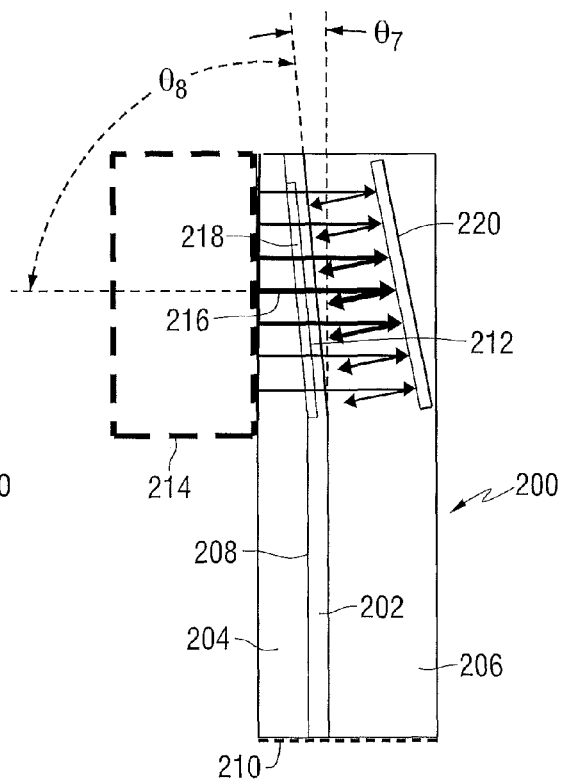
FIG. 9 is a side view of a waveguide and a light source.

FIG. 9 is a side view of another embodiment including a waveguide and a light source. In FIG. 9, the waveguide 200 is shown to have a core layer 202 with cladding layers 204 and 206 on opposite sides of the core layer. The core layer 202 includes a first portion 208 that lies in a first plane substantially perpendicular to air bearing surface 210 and a second portion 212 that is positioned in a second plane at an acute angle $\theta_7$ with respect to the first plane. The VCSEL 214 is mounted on the cladding layer 204 and emits light 216 that impinges on the grating 218 at an acute angle $\theta_8$. A flat mirror 220 is positioned under the grating in an attempt to improve the coupling efficiency. In this example, the mirror lies in a plane substantially parallel to the second plane of the core layer. However, the mirror can alternatively lie in another plane selected to improve the coupling of reflected light into the core layer. In any case, if the mirror is parallel to the VCSEL output facet, it can be used as part of an extended cavity VCSEL.

Figure 10:
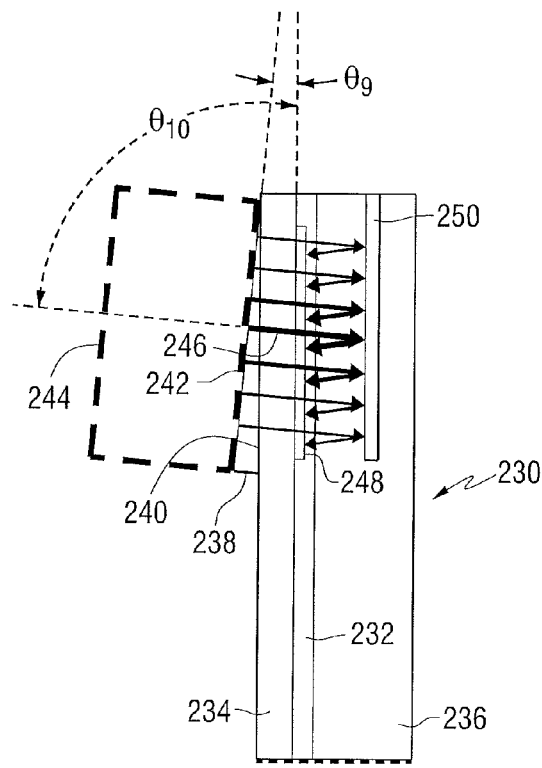
FIG. 10 is a side view of a waveguide and a light source.

FIG. 10 is a cross-sectional view of another embodiment. In FIG. 10, the waveguide 230 is shown to have a core layer 232 with cladding layers 234 and 236 on opposite sides of the core layer. A wedge 238 is positioned on a surface 240 of cladding layer 234 and provides a sloped surface 242 that is inclined at an angle $\theta_9$ with respect to the plane of the core layer. The VCSEL 244 is mounted on the sloped surface and emits light 246 that impinges on the grating 248 at an acute angle $\theta_{10}$. A flat minor 250 is positioned under the grating in an attempt to improve the coupling efficiency. In this example, the minor lies in a plane substantially parallel to the plane of the core layer.

Figure 11:
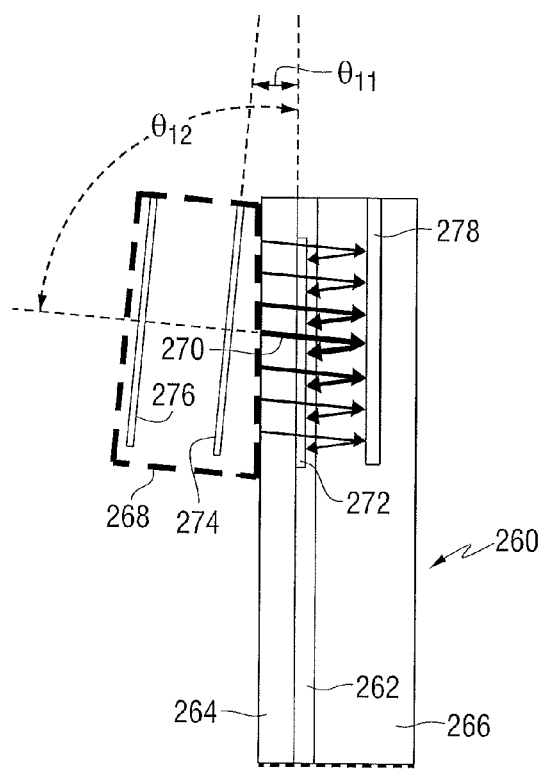
FIG. 11 is a side view of a waveguide and a light source.

FIG. 11 is a cross-sectional view of another embodiment. In FIG. 11, the waveguide 260 is shown to have a core layer 262 with cladding layers 264 and 266 on opposite sides of the core layer. A VCSEL 268 is mounted on the cladding layer 264 and emits light 270 that impinges on the grating 272 at an acute angle $\theta_{11}$. The VCSEL includes lasing minors 274 and 276 that lie in planes that are inclined at an angle $\theta_{12}$ with respect to the plane of the core layer. A flat mirror 278 is positioned under the grating in an attempt to improve the coupling efficiency. In this example, the minor lies in a plane substantially parallel to the plane of the core layer.

The implementations described above and other implementations are within the scope of the following claims.

What is claimed is:

1. An apparatus, comprising:
   a transducer assembly including a waveguide having a core layer and a cladding layer adjacent to the core layer, and a grating structured to couple electromagnetic radiation into the waveguide; and
   a light source mounted on a sloped portion of the cladding layer to direct light onto the grating at an acute angle with respect to a plane containing the grating.

2. An apparatus, comprising:
   a transducer assembly including a waveguide having a core layer and a cladding layer adjacent to the core layer, and a grating structured to couple electromagnetic radiation into the waveguide; and
   a light source mounted on the cladding to direct light onto the grating at an acute angle with respect to a plane containing the grating, wherein the core layer includes a planar portion positioned substantially perpendicular to an air bearing surface and a sloped portion containing the grating and positioned at an acute angle with respect to the planar portion.

3. The apparatus of claim 2, wherein the light source directs light in a direction substantially perpendicular to the planar portion of the waveguide.

4. The apparatus of claim 1, wherein the light source comprises a vertical cavity surface emitting laser.

5. The apparatus of claim 4, wherein the vertical cavity surface emitting laser includes first and second lasing mirrors lying in planes that are tilted with respect to the plane containing the grating.

6. The apparatus of claim 1, further comprising:
   a mirror positioned on an opposite side of the core layer as the cladding layer.

7. The apparatus of claim 6, wherein the core layer includes a planar portion positioned substantially perpendicular to an air bearing surface and a sloped portion containing the grating and positioned at an acute angle with respect to the planar portion, and the mirror lies in a plane substantially parallel to the planar portion.

8. The apparatus of claim 6, wherein the core layer includes a planar portion positioned substantially perpendicular to an air bearing surface and a sloped portion containing the grating and positioned at an acute angle with respect to the planar portion, and the mirror lies in a plane substantially parallel to the sloped portion.

9. An apparatus, comprising:
   a transducer assembly including a waveguide having a core layer and a cladding layer adjacent to the core layer, and a grating structured to couple electromagnetic radiation into the waveguide;
   a light source mounted on the cladding to direct light onto the grating at an acute angle with respect to a plane containing the grating; and
   a wedge between the light source and a surface of the cladding layer.

10. The apparatus of claim 2, further comprising:
    a data storage medium; and
    an arm for positioning the transducer with respect to the data storage medium.

11. The apparatus of claim 2, wherein the light source is mounted on a sloped portion of the cladding layer.

12. The apparatus of claim 2, wherein the core layer includes a planar portion positioned substantially perpendicular to an air bearing surface and a sloped portion containing the grating and positioned at an acute angle with respect to the planar portion.

13. The apparatus of claim 12, wherein the light source directs light in a direction substantially perpendicular to the planar portion of the waveguide.

14. The apparatus of claim 2, wherein the light source comprises a vertical cavity surface emitting laser.

15. The apparatus of claim 14, wherein the vertical cavity surface emitting laser includes first and second lasing mirrors lying in planes that are tilted with respect to the plane containing the grating.

16. The apparatus of claim 2, further comprising:
    a mirror positioned on an opposite side of the core layer as the cladding layer.

17. The apparatus of claim 16, wherein the core layer includes a planar portion positioned substantially perpendicular to an air bearing surface and a sloped portion containing the grating and positioned at an acute angle with respect to the planar portion, and the mirror lies in a plane substantially parallel to the planar portion.

18. The apparatus of claim 16, wherein the core layer includes a planar portion positioned substantially perpendicular to an air bearing surface and a sloped portion containing the grating and positioned at an acute angle with respect to the planar portion, and the mirror lies in a plane substantially parallel to the sloped portion.

19. The apparatus of claim 2, further comprising:
    a wedge between the light source and a surface of the cladding layer.

\* \* \* \* \*